(12) United States Patent
Foltz et al.

(10) Patent No.: US 6,679,396 B1
(45) Date of Patent: Jan. 20, 2004

(54) REDUNDANT SEAL FOR TANK FILLER NECK CLOSURE

(75) Inventors: Dean C. Foltz, Shelbyville, IN (US); Jason K. Jobe, Glenwood, IN (US); Robert S. Harris, Connersville, IN (US)

(73) Assignee: Stant Manufacturing Inc., Connersville, IN (US)

( * ) Notice: Subject to any disclaimer, the term of this patent is extended or adjusted under 35 U.S.C. 154(b) by 0 days.

(21) Appl. No.: 09/980,612

(22) PCT Filed: May 17, 2000

(86) PCT No.: PCT/US00/13481

§ 371 (c)(1), (2), (4) Date: Nov. 2, 2001

(87) PCT Pub. No.: WO00/69722

PCT Pub. Date: Nov. 23, 2000

Related U.S. Application Data

(60) Provisional application No. 60/134,594, filed on May 17, 1999.

(51) Int. Cl.[7] .................................................. B65B 3/00
(52) U.S. Cl. .................. 220/86.2; 141/301; 141/203.01
(58) Field of Search ............................... 220/86.2, 86.3, 220/203.01, 203.13; 141/312, 382, 301, 302, 308

(56) References Cited

U.S. PATENT DOCUMENTS

| 3,951,297 | A | | 4/1976 | Martin |
| 5,186,220 | A | | 2/1993 | Scharrer |
| 5,271,438 | A | | 12/1993 | Griffin et al. |
| 5,348,177 | A | * | 9/1994 | Sung .......................... 220/86.2 |
| 5,638,874 | A | * | 6/1997 | Thompson .................. 141/312 |
| 5,658,036 | A | * | 8/1997 | Benoist ..................... 296/97.22 |
| 5,730,194 | A | | 3/1998 | Foltz |
| 6,250,348 | B1 | * | 6/2001 | Reinholdt ................... 141/382 |

* cited by examiner

Primary Examiner—Joseph M. Moy
(74) Attorney, Agent, or Firm—Barnes & Thornburg

(57) ABSTRACT

A redundant seal for a vehicle fuel tank filler neck closure is provided for closing and opening an automobile fuel tank to the atmosphere. The redundant seal (48) includes a lower shoulder (51) which sealably engages a first valve seat and an upper shoulder (53) which sealably engages a second valve seat. The redundant seal (48) is appropriate for use in applications such as filler neck closures, pressure and vacuum-relief systems within tank filler neck closures, and capless filler neck closure systems.

31 Claims, 12 Drawing Sheets

REDUNDANT SEAL FOR TANK FILLER NECK CLOSURE

This application is a 371 of a PCT/US00/13481, filed May 17, 2000, which claims benefit of provisional application Ser. Number 60/134,594, filed May 17, 1999.

BACKGROUND AND SUMMARY OF THE INVENTION

The present invention relates to a tank filler neck closure, and particularly to a seal for a tank filler neck closure. More particularly, the invention relates to a seal adapted to be mounted on a removable fuel cap used to close the open end of a filler neck or on a filler neck shuttle that is movable in a passageway formed in a capless vehicle refueling system to open and close a tank filler neck.

Elastomeric seals are used on fuel caps and in capless filler neck closures to block flow of fuel vapor and liquid fuel out of tank filler necks. Such seals are often positioned to engage an adjacent surface in a filler neck or filler neck component to establish a sealed closure. A seal configured to establish an enhanced sealed closure with an adjacent surface in a tank filler neck system would minimize unwanted filler neck leakage.

According to the present invention, a filler neck closure apparatus includes a fluid conduit formed to include a fluid-conducting passageway and first and second valve seats associated with the fluid-conducting passageway, a seal mount movable in the fluid-conducting passageway, and a seal coupled to the seal mount to move therewith in the fluid-conducting passageway to engage each of the first and second valve seats to establish a closed position blocking flow of fluid in the fluid-conducting passageway. The seal includes a body coupled to the seal mount and lower and upper shoulders coupled to the seal mount. The lower shoulder is arranged to engage the first valve seat upon movement of the seal to the closed position to establish a first sealed closure in the fluid-conducting passageway. The upper shoulder is arranged to engage the second valve seat upon movement of the seal to the closed position to establish a "redundant," second sealed closure in the fluid-conducting passageway in spaced-apart relation to the first sealed closure so that each of the first and second sealed closures is operable to block flow of fluid through the fluid-conducting passageway formed in the fluid conduit.

In preferred embodiments, the fluid conduit is a filler neck adapted to be coupled to a vehicle fuel tank and the seal mount is an internal tube called a filler neck shuttle that is movable to open and close the filler neck. The seal is coupled to one end of the filler neck shuttle and is arranged to engage the first valve seat provided on an interior wall of the filler neck and the second valve seat provided on a lug coupled to the interior wall of the filler neck to establish the first and second sealed closures in the fluid-conducting passageway formed in the filler neck.

The filler neck shuttle is formed to include a fill passageway that is configured to conduct fuel discharged by a fuel-dispensing nozzle toward a vehicle fuel tank when the filler neck is opened. The filler neck includes a conduit having an outer end formed to include a mouth, an inner end formed a conduit outlet, and a fluid-conducting passageway extending between the mouth and the conduit outlet and receiving the movable filler neck shuttle therein. The conduit outlet is adapted to be coupled to a fuel tank inlet via a fill tube or the like.

The lug is an annular member that is positioned in the conduit to divide the fluid-conducting passageway into an outer chamber communicating with the mouth and an inner chamber communicating with the conduit outlet and thus the fuel tank. The annular lug is formed to include a channel extending therethrough. The channel interconnects the outer and inner chambers in the conduit.

The filler neck shuttle is positioned for reciprocating movement in the fluid-conducting passageway and annular lug channel between a channel-opening position and a channel-closing position. The filler neck shuttle is formed to include a nozzle-receiving inlet configured to provide an opening into the fill passageway and positioned to face toward the mouth of the conduit and to receive the fuel-dispensing nozzle inserted therein during refueling. The shuttle is also formed to include a fuel-dispensing outlet for emptying liquid fuel discharged into the fill passageway by a nozzle from the fill passageway into the inner chamber upon movement of the shuttle to the channel-opening position. A spring is provided in the conduit to urge the shuttle toward its normal channel-closing position. The seal is coupled to the shuttle to surround the fuel-dispensing opening and to cause the lower shoulder of the seal to engage the first valve seat on the interior wall of the filler neck and to cause the upper shoulder of the seal to engage the second valve seat on the annular lug upon movement of the shuttle to the normal channel-closing position.

Preferably, in use, a fuel-dispensing nozzle is inserted by a user through the filler neck conduit and into the nozzle-receiving inlet and fill passageway provided in the movable filler neck shuttle. By manually pushing the nozzle further into the conduit and against the spring-loaded shuttle, the shuttle and its fill passageway can be moved through the partition channel formed in the partition unit to move the shuttle fuel-dispensing outlet into the inner chamber in the conduit so that liquid fuel discharged from the nozzle into the shuttle fill passageway can pass through the shuttle fuel-dispensing outlet into the inner chamber and onto the fuel tank.

In other preferred embodiments, the fluid conduit is an externally threaded closure member included in a removable fuel cap and sized to engage and close the open end of a fuel tank filler neck, the seal mount is a spring-loaded support plate, and the seal is either (1) a pressure-relief valve coupled to the seal mount to move therewith in the fluid-conducting passageway formed in the threaded closure member to engage the first and second valve seats provided on an annular lug coupled to an interior wall in the externally threaded closure member; or (2) a vacuum-relief valve coupled to the seal mount to move therewith to engage first and second valve seats provided on a spring-loaded vacuum-relief member sized to cooperate with the seal to close a vacuum-relief opening formed in the spring-loaded support plate.

In yet other preferred embodiments, the fluid conduit is a filler neck adapted to be coupled to a vehicle fuel tank and the seal mount is an external surface on an externally threaded closure member included in a removable fuel cap and sized to engage and close the open end of a fuel tank filler neck. The seal is coupled to the external surface on the threaded closure member and is arranged to engage the first valve seat provided on a radially inwardly facing interior wall of the filler neck near the inlet opening into the filler neck and the second valve seat provided on an axially outwardly facing outer wall of the filler neck at the inlet opening into the filler neck to establish the first and second sealed closures in the fluid-conducting passageway formed in the filler neck.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
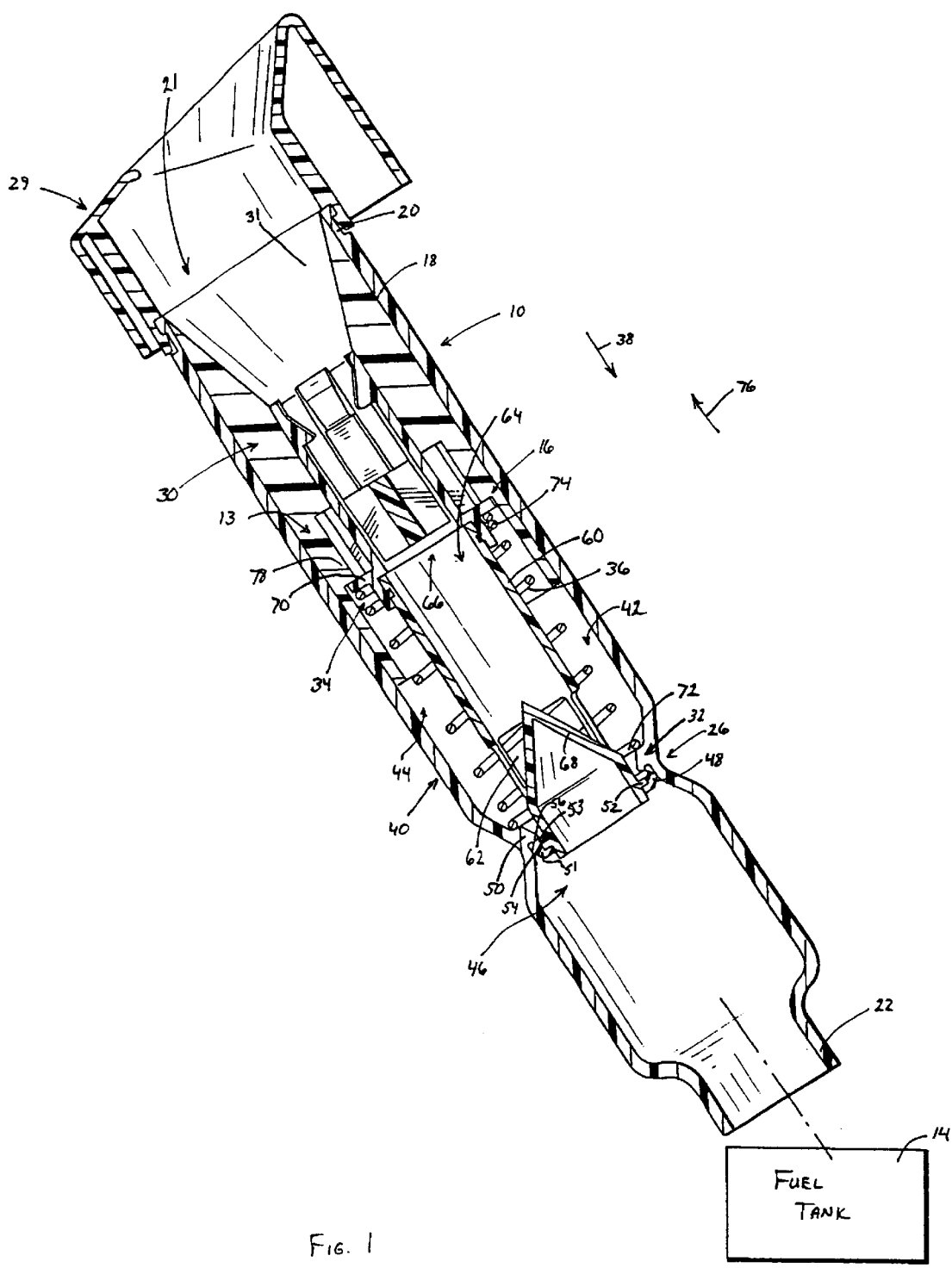
FIG. 1 is a perspective view of a filler neck showing a filler neck closure mechanism positioned to lie in the filler neck and the filler neck closure mechanism including a fluid-conducting passageway containing a movable filler neck shuttle, a spring urging the filler neck shuttle in an outward direction, and a seal engaging a necked-down restriction formed in the filler neck and an annular lug coupled to the necked-down restriction to establish separate and redundant first and second sealed closures in the filler neck.
Figure 8:
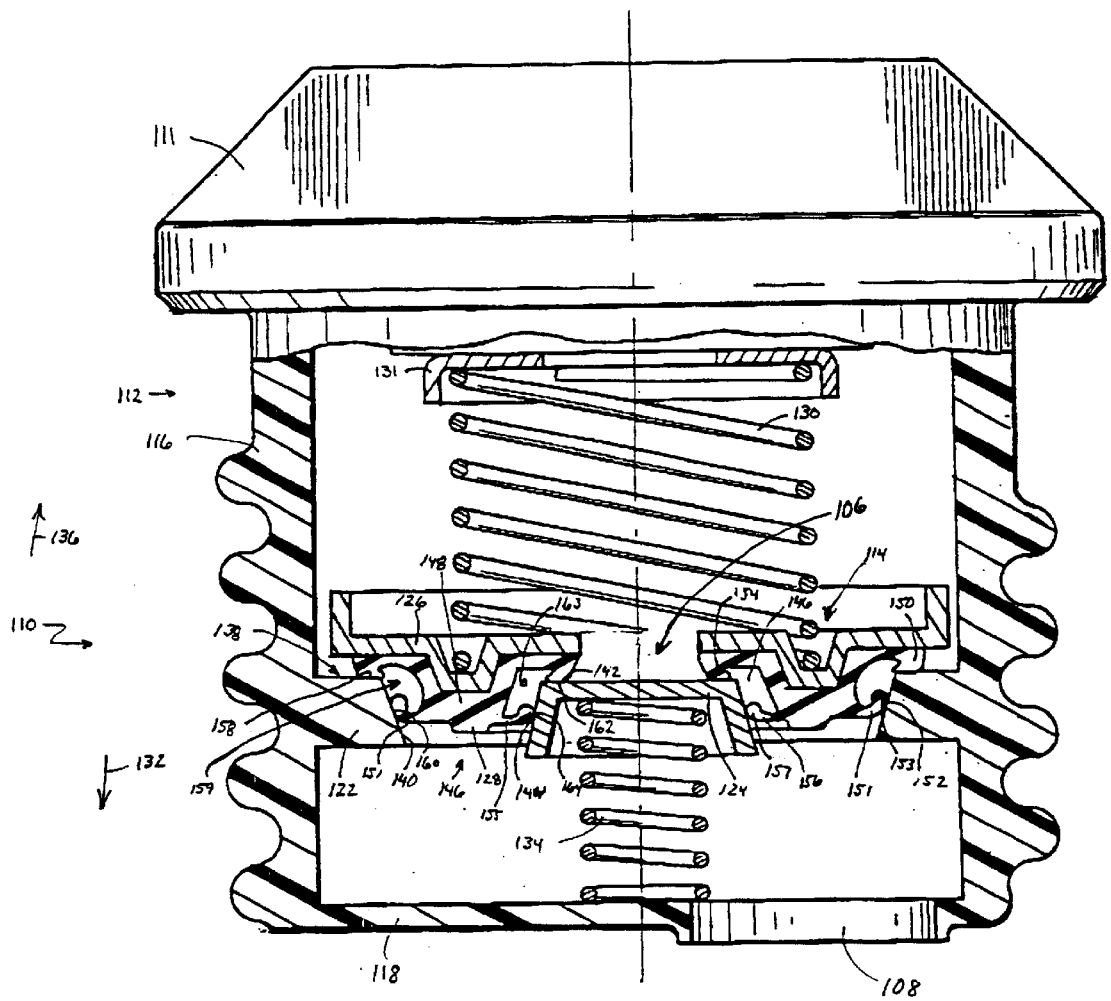
FIG. 8 is a side elevation view of the filler neck closure of FIG. 7, with portions broken away, showing the seal mounted on the underside of the spring-loaded seal mount and formed to include a body, radially outwardly positioned lower and upper shoulders engaging first and second valve seats provided on an annular lug coupled to an interior wall in the closure normally to close a vent channel formed in the annular lug (to provide a pressure-relief valve), and radially inwardly positioned lower and upper shoulders engaging additional first and second valve seats provided on a spring-loaded vacuum-relief member sized normally to close a vacuum-relief opening formed in the seal mount (to provide a vacuum-relief valve)
Figure 16:
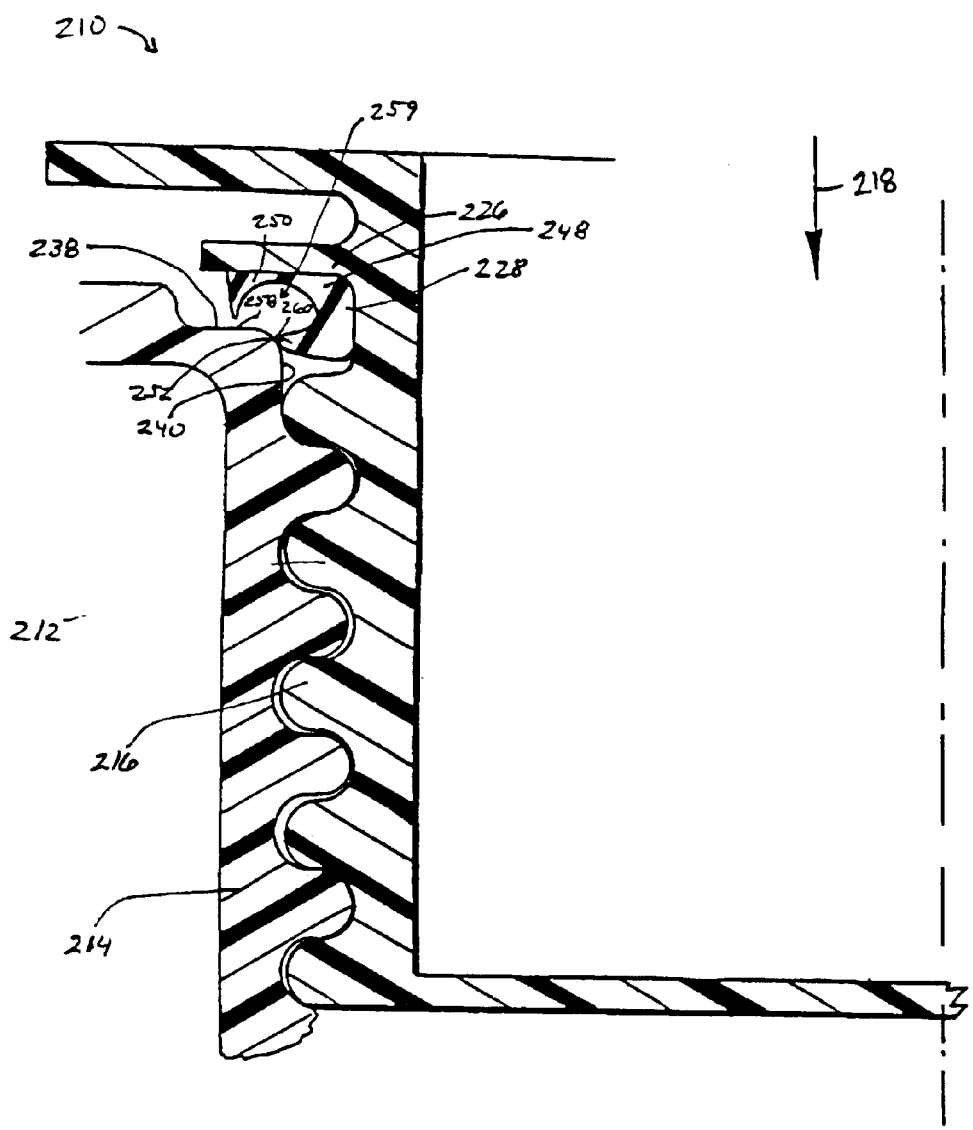
FIG. 16 is a sectional view taken along line 16-16 through the closure and filler neck of FIG. 15 showing a seal in accordance with the present invention mounted on an external portion of the closure as the closure is being threadedly installed in a companion filler neck and showing engagement of a lower shoulder of the seal with a first valve seat provided on a radially inwardly facing wall of the filler neck to establish a first sealed closure and just before engagement of an upper shoulder on the seal with an axially outwardly facing wall of the filler neck.
Figure 17:
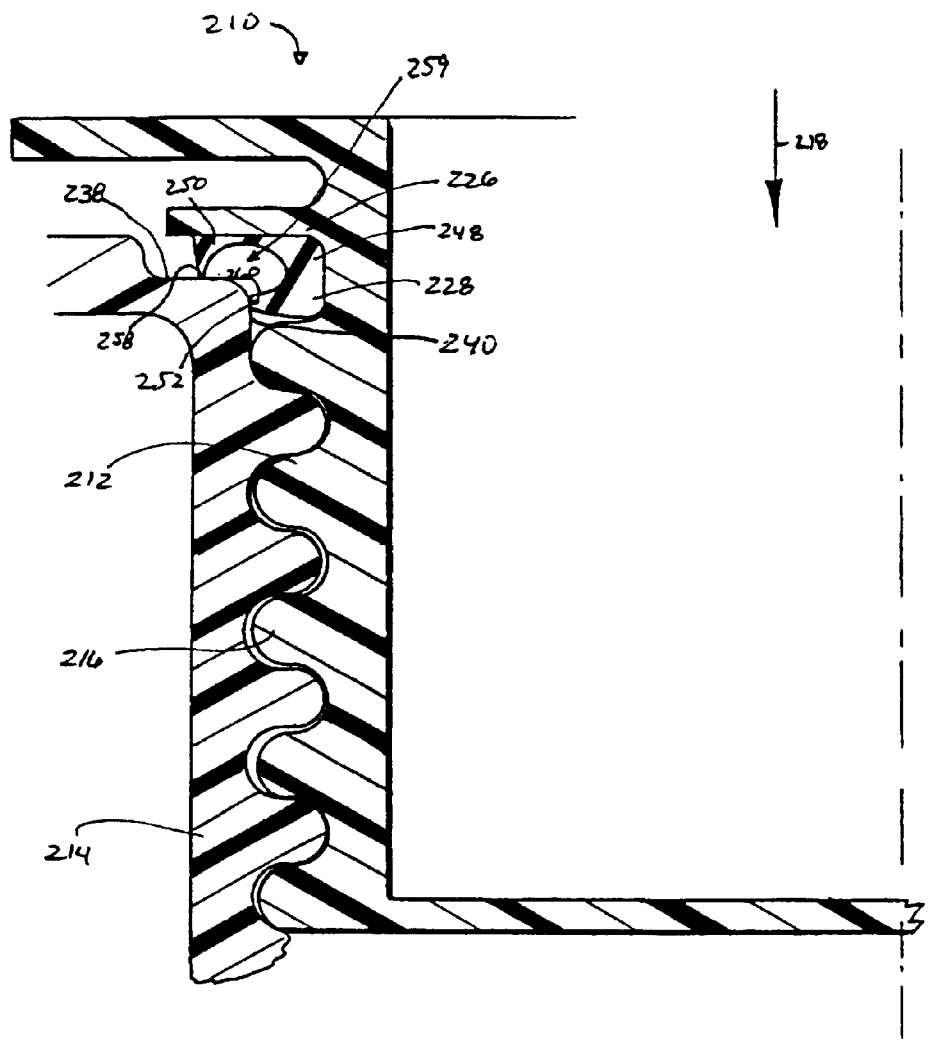
FIG. 17 is a view similar to FIG. 16 showing the closure after it has been inserted further into the filler neck mouth and showing the first contact of the upper shoulder of the seal with the second valve seat provided on the axially outwardly facing surface of the filler neck.

A redundant seal in accordance with the present invention is shown, for example in FIGS. 1, 8, and 16. The redundant seal provides a dual seal to prevent flow of a fluid through a vehicle fuel tank filler neck. A seal having a lower shoulder, and an upper shoulder is coupled to a single seal mount that is movable within a fluid conduit formed in either a filler neck as shown in FIGS. 1 and 16 or a fuel cap as shown in FIG. 8. The fluid conduit is formed to include a fluid-conducting passageway and first and second valve seats associated with the fluid-conducting passageway. A closed position is established when the lower and upper shoulders of the seal engage the first and second valve seats respectively. Upon failure of either seal, i.e. failure of the engagement between either the upper or lower seal shoulders with respective first or second valve seats, the other engagement continues to block the flow of the fluid through the fluid-conducting passageway. The engagement of the first valve seat with the lower shoulder creates a radial "upper" seal. The engagement of the second valve seat with the upper shoulder creates an axial "compression" seal. These two engagements are separate in that the lower and upper shoulders engage the first and second valve seats in spaced-apart relation.

Figure 2:
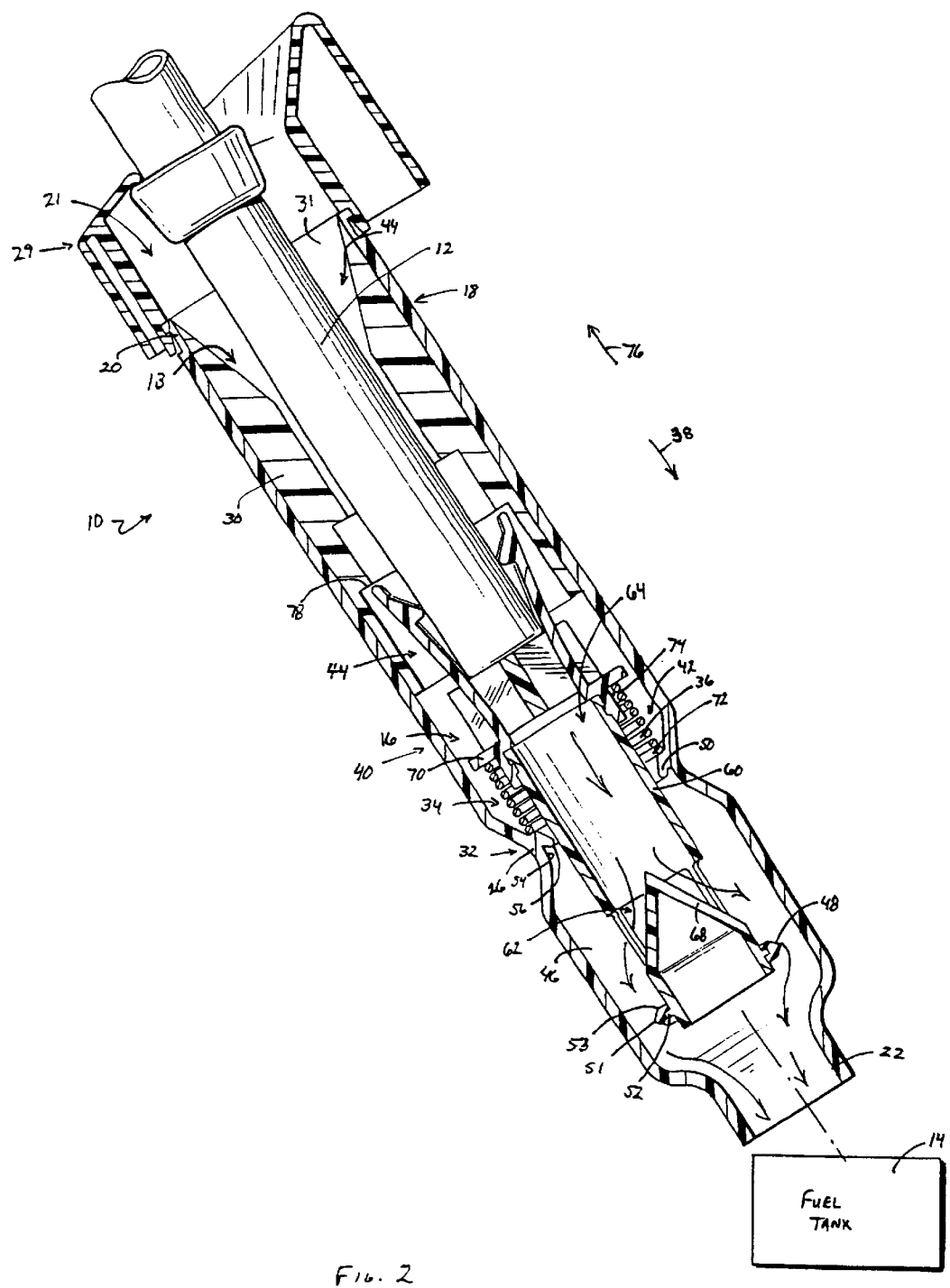
FIG. 2 is a perspective view of the filler neck of FIG. 1 showing a fuel-dispensing nozzle partially inserted in the filler neck and urging the shuttle inwardly and the seal carried on the shuttle out of engagement with the necked-down restriction and the annular lug in the filler neck to "break" the redundant first and second sealed closures established by the seal to allow liquid fuel dispensed by the fuel-dispensing nozzle to flow through the filler neck into the fuel tank.

A filler neck 10 is shown in section in FIGS. 1 and 2, and is used to deliver liquid fuel from a fuel-dispensing nozzle 12 to a fuel tank 14. The filler neck 10 also includes an internal nozzle-actuated opening and closing mechanism 16 which operates to control flow of liquid fuel through filler neck 10.

The internal nozzle-actuated filler neck opening and closing mechanism 16 is configured to accept short-length, standard-length, and long-length fuel-dispensing nozzles that are inserted into filler neck 10 manually by a user and/or automatically by a robotic refueling system (not shown). The mechanism can also function to vent pressurized fuel vapor from fuel tank 14 whenever the pressure extant in fuel tank 14 exceeds a predetermined positive pressure as may occur on a hot day and permit outside air to enter fuel tank 14 when a vacuum above a predetermined negative pressure exists in fuel tank 14. A system for venting pressurized fuel from fuel tank 14 and introducing outside air therein is disclosed in U.S. Pat. No. 5,730,194 to Dean C. Foltz, which disclosure is expressly incorporated by reference herein.

Filler neck 10 includes a fluid conduit such as fluid-conducting passageway 18 having an outer end 20 that is arranged to receive fuel-dispensing nozzle 12 during refueling and a restricted inner end 22 that is adapted to be coupled to a filler pipe (not shown) that conducts liquid fuel between fluid-conducting passageway 18 and fuel tank 14. Between outer end 20 and inner end 22, fluid-conducting passageway 18 is formed to include a radially inwardly extending restriction 26. A tank venting tube (not shown) is appended to fluid-conducting passageway 18 and fuel tank 14 so as to conduct displaced fuel vapor from fuel tank 14 to fluid-conducting passageway 18. A suitable configuration for a tank venting tube is disclosed in U.S. Pat. No. 5,730,194.

An appearance cover unit 29 is mounted on outer end 20 of fluid-conducting passageway 18 to give the outward appearance that capless filler neck 10 is closed to provide comfort to consumers unable to see internal opening and closing mechanism 16. Appearance cover unit 29 also functions to keep unwanted dust and debris out of fluid-conducting passageway 18 and admit only unleaded fuel-dispensing nozzles into fluid-conducting passageway 18. Another suitable appearance cover unit is disclosed in U.S. Pat. No. 5,730,194.

As shown in FIGS. 1–5, internal nozzle-actuated opening and closing mechanism 16 includes a shuttle housing 30 configured to fit in fluid-conducting passageway 18, a partition unit 32 inside fluid-conducting passageway 18, a filler neck shuttle 34 positioned for movement inside shuttle housing 30 and fluid-conducting passageway 18, and a spring 36 acting between partition unit 32 and filler neck shuttle 34. The mechanism further includes a shuttle guide appended to shuttle housing 30. A suitable shuttle guide is disclosed in U.S. Pat. No. 5,730,194.

Figure 5:
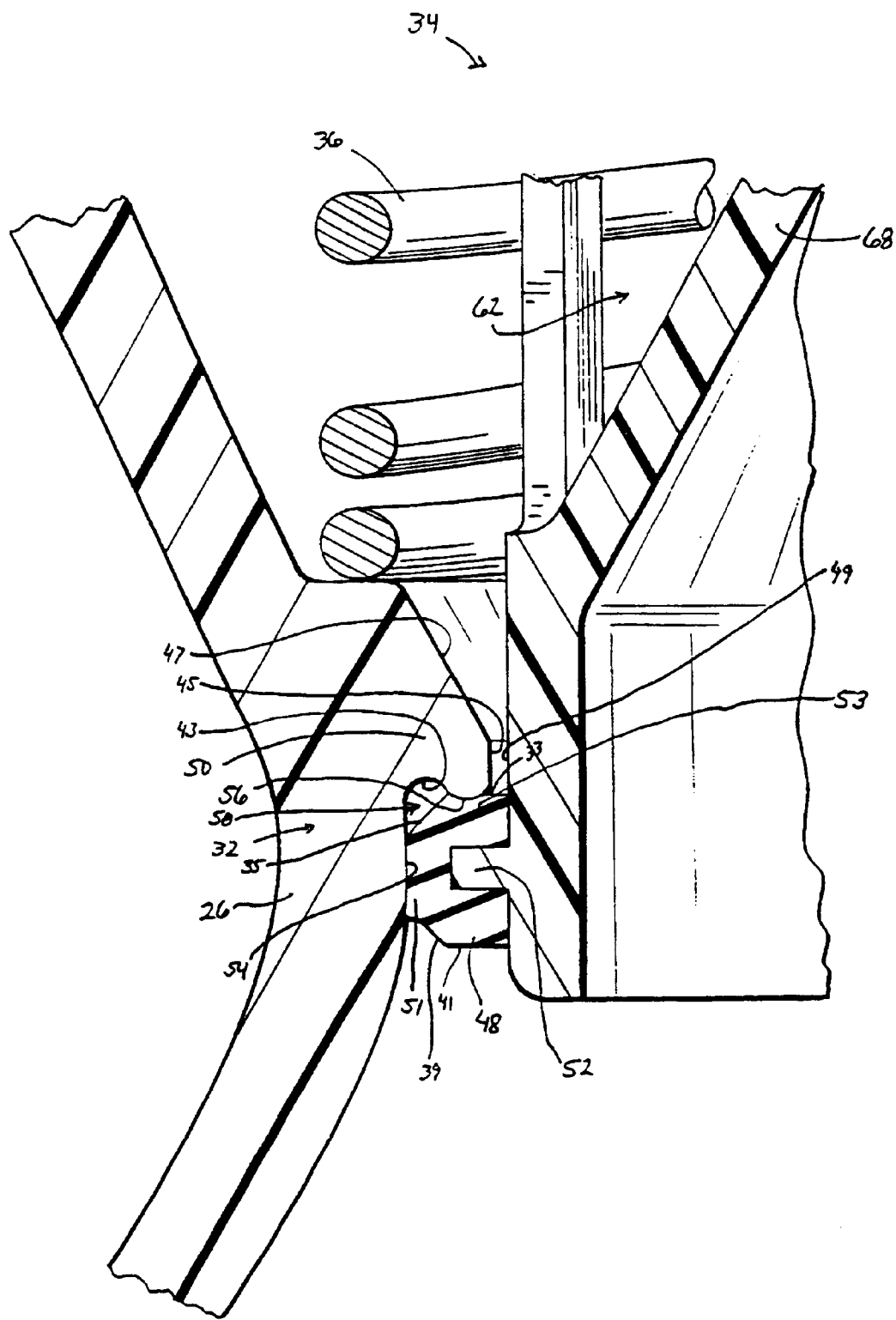
FIG. 5 is a view similar to FIGS. 3 and 4 showing the lower shoulder of the seal engaging the necked-down restriction formed in the fill neck at a first valve seat and the upper shoulder of the seal engaging the annular lug at a second valve seat that is positioned in spaced-apart relation to the first valve seat to define a gap therebetween.
Figures 6, 7:
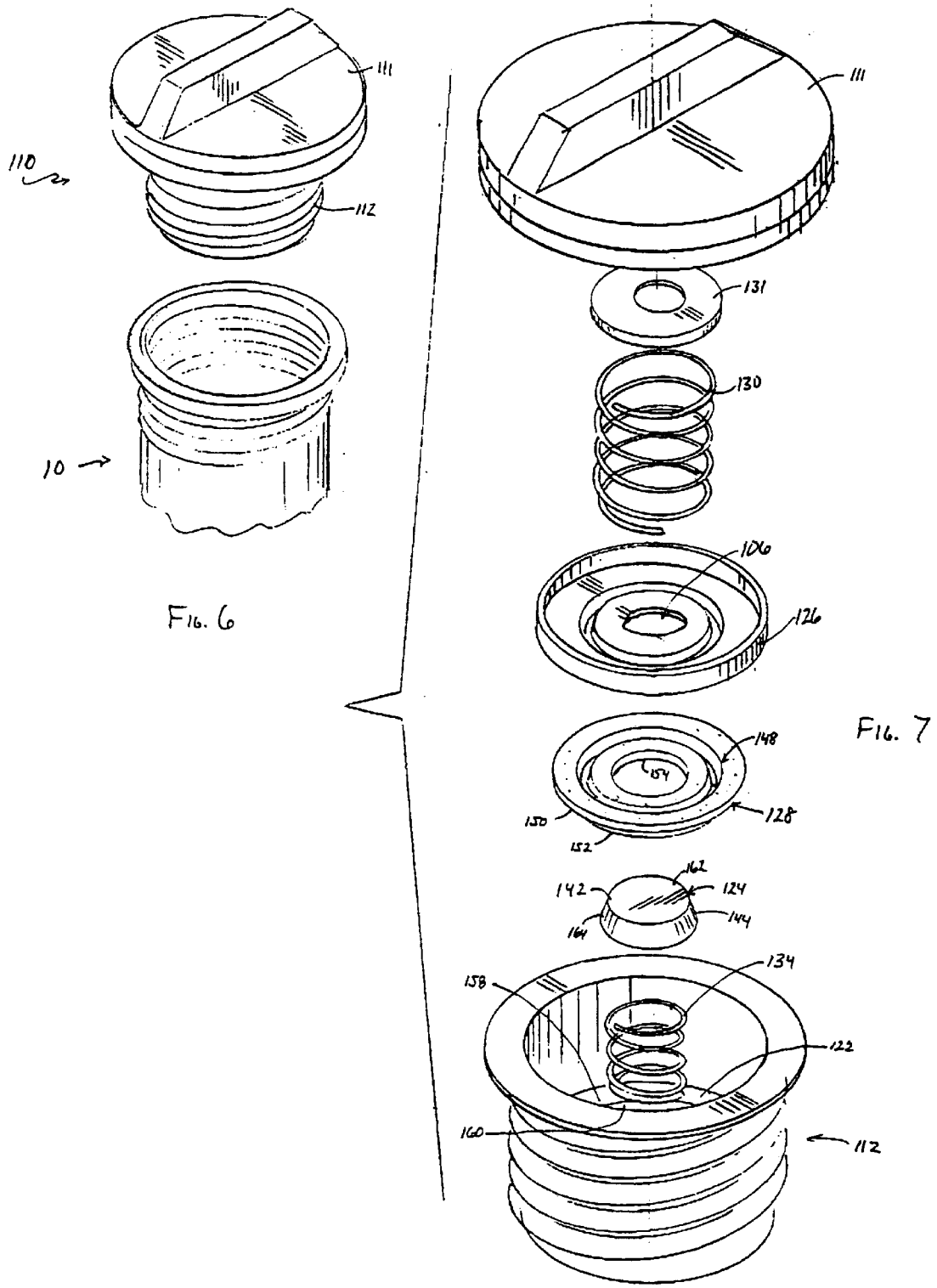
FIG. 6 is a perspective view of a vehicle tank filler neck closure configured to include other embodiments of a redundant seal in accordance with the present invention and a fuel tank filler neck configured to receive the closure.
FIG. 7 is an exploded perspective view of a filler neck closure showing a spring retainer, an upper spring, a seal mount, a seal, a vacuum-relief member, a lower spring, and a threaded filler neck closure body.

Spring 36 normally biases the movable filler neck shuttle 34 to a filler neck-closing position, as shown in FIGS. 1 and 5, wherein an axially inner end of filler neck shuttle 34 is retained in sealed engagement with partition unit 32 and an axially outer end of filler neck shuttle 34 engages shuttle housing 30 to stop the outward travel of filler neck shuttle 34 as shown in FIG. 1. During refueling, a fuel-dispensing nozzle 12 inserted into filler neck 10 operates to move filler neck shuttle 34 in an axially inward direction 38 in fluid-conducting passageway 18 relative to restriction 26 so that sealed engagements therebetween are disengaged and filler neck shuttle 34 is moved in axial direction 38 to a filler neck-opening position as shown, for example, in FIG. 2. Filler neck shuttle 34 has a nozzle-receiving end that can flex or expand to allow passage of long-length fuel-dispensing nozzles 12 into filler neck shuttle 34 during refueling. Further detail on a suitable nozzle-receiving end of a filler neck shuttle is disclosed in U.S. Pat. No. 5,730,194.

Shuttle housing 30 is made of a plastics material such as acetal or the like and may include a wear-resistant additive to increase life. Shuttle housing 30 is sized to fit in a neck passageway 13 formed in fluid-conducting passageway 18 as shown in FIG. 1. Shuttle housing 30 includes a cylindrical sleeve 40 formed to include an interior region 42 containing filler neck shuttle 34. Shuttle housing 30 has a tapered portion 31 configured to guide nozzle 12 into engagement with filler neck shuttle 34.

As shown in FIGS. 1–5, partition unit 32 includes a necked-down restriction 26, inclined surface 42, vertical surface 45, and cavity 43, and is positioned to divide fluid-conducting passageway 18 into an outer chamber 44 communicating with a mouth 21 formed in outer end 20 of fluid-conducting passageway 18 and an inner chamber 46 communicating with an outlet formed in inner end 22 of fluid-conducting passageway 18. Partition unit 32 further includes a seal 48 coupled to filler neck shuttle 34 and a seal engagement member or lug 50 associated with restriction 26. Filler neck shuttle 34 serves as a seal mount for seal 48 and includes a fixture mount 52 and seal 48 is coupled to and supported by mount fixture 52. A suitable configuration for coupling the seal to the conduit is disclosed in U.S. Pat. No. 5,730,194.

Figure 3:
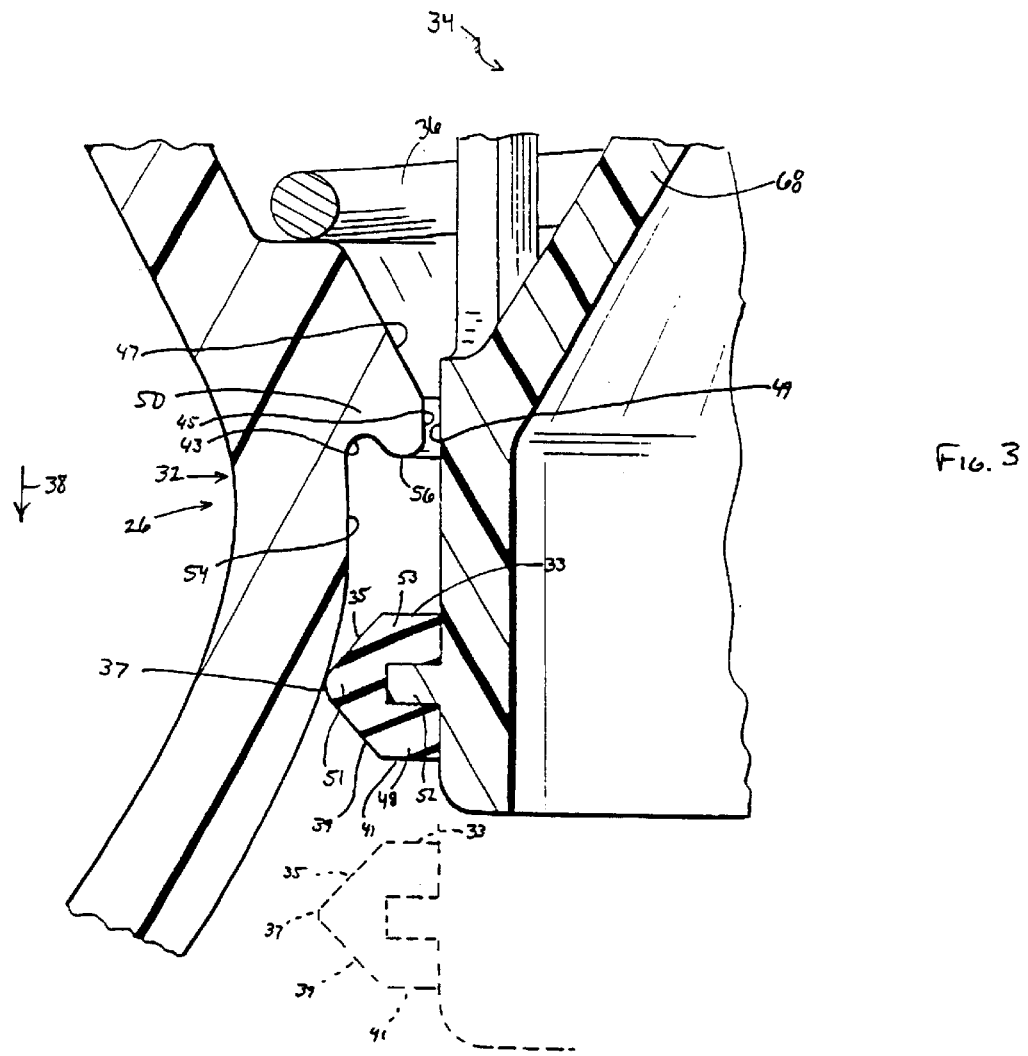
FIG. 3 is an enlarged sectional view of a portion of the apparatus shown in FIGS. 1 and 2 showing the position of the seal carried on the shuttle just prior to engagement of a radially outward first shoulder portion of the seal against a "first valve seat" provided on a radially inwardly facing surface of the necked-down restriction in the filler neck as the shuttle is being returned by the spring to closed position in the filler neck.
Figure 4:
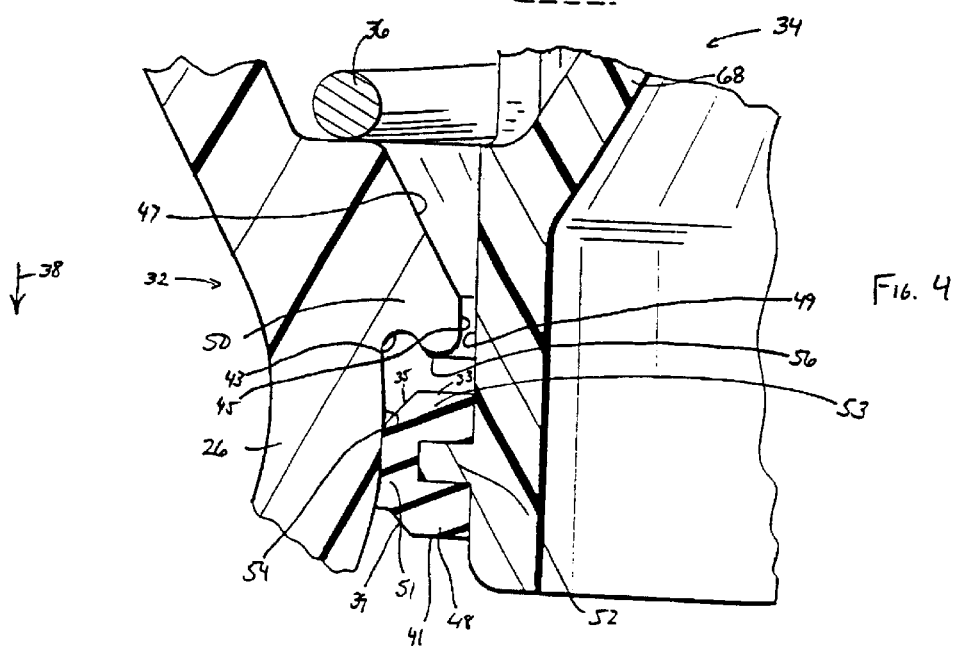
FIG. 4 is a view similar to FIG. 4 showing the position and deformation of the seal carried on the shuttle upon engagement of the seal against the first valve seat to establish the first sealed closure and just prior to engagement of an axially upper second shoulder portion of the seal against a "second valve seat" provided on an axially inwardly facing surface on the annular lug in the filler neck.

Seal 48 functions as two tank venting tube seals between filler neck shuttle 34 and fluid-conducting passageway 18. As shown in FIGS. 3–5, seal 48 has first, second, third, fourth, and fifth surfaces 33, 35, 37, 39, 41. First, second, fourth and fifth surfaces 33, 35, 39, 41 are generally flat, while third surface 37 is curved. As shown in FIG. 5, seal 48 is positioned to extend toward fluid-conducting passageway 18 so that a lower shoulder 51 of seal 48 seals against restriction 26 at a first valve seat 54 to establish sealing engagement (i.e., first sealed closure) between filler neck shuttle 34 and fluid-conducting passageway 18. An upper shoulder 53 of seal 48 is also positioned to engage seal engagement member 50 at a second valve seat 56 separate from first valve seat 54 to establish sealing engagement (i.e., second sealed closure) between filler neck shuttle 34 and fluid-conducting passageway 18 and to define a gap 58 between first and second sealing valve seats 54, 56. By providing two sealing valve seats 54, 56, the leakage path between filler neck shuttle 34 and fluid-conducting passageway 18 is sealed twice using only one seal 48. Furthermore, the contact between lower shoulder 51 and first valve seat 54 is a radially compressive seal and the contact between upper shoulder 53 and second valve seat 56 is axially compressive so that two modes of sealing are provided with a single sealing member, seal 48.

Seal 48 also functions as a dual-mode seal to prevent leakage of fuel between seal 48 and seal mount 34. Compression of lower shoulder 51 of seal 48 against first valve seat 54 in a radial direction against lower shoulder 51 urges seal 48 in a radial direction against seal mount 34. Further, compression of upper shoulder 53 of seal 48 against second valve seat 56 in an axial direction against upper shoulder 53 urges seal 48 against seal mount 34. The forces urging seal 48 in both axial and radial directions achieve a dual sealing mode. The combination of axial and radial compressive forces exerted on seal 48 against seal mount 34 is believed superior to known seals in preventing leaks between seal 48 and seal mount 52 once seal 48 is exposed to fuel.

As shown in FIGS. 1 and 2, filler neck shuttle 34 includes a fill tube 60 including a fuel-discharging outlet 62 formed in a side wall at an inner end of fill tube 60, a fill passageway 64 having an inlet 66 conducting liquid fuel from a fuel-dispensing nozzle 12 inserted into filler neck shuttle 34 to fuel-discharging outlet 62. A raised conical bottom wall 68 is provided in fill passageway 64 near outlet 62 to provide means for directing liquid fuel discharged from nozzle 12 into fill passageway 64 out of filler neck shuttle 34 through fuel-discharging outlet 62.

Filler neck shuttle 34 includes vertical surface 49 and also includes an annular flange 70 coupled to fill tube 60. Spring 36 is a coiled compression spring formed to "wind" around movable filler neck shuttle 34. An inner end 72 of spring 36 abuts restriction 26 and an outer end 74 of spring 36 abuts annular flange 70 on filler neck shuttle 34. Spring 36 functions to yieldably urge filler neck shuttle 34 outwardly in direction 76 in fluid-conducting passageway 18 toward mouth 21 of fluid-conducting passageway 18 to place filler neck shuttle 34 in its normal filler neck-closing position depicted in FIGS. 1 and 2. In this position, spring 36 urges annular flange 70 toward a transverse wall 78 of shuttle housing 30 to provide a limit to the outward travel of filler neck shuttle 34.

Prior to refueling, filler neck 10 is normally in a closed position as shown in FIG. 1. Fuel-dispensing nozzle 12 has not yet been inserted into fluid-conducting passageway 18. At this stage, spring 36 has urged filler neck shuttle 34 to position lower and upper shoulders 51, 53 of seal 48 in engagement with first and second valve seats 54, 56 to establish two spaced apart and sealed engagements between filler neck shuttle 34 and shuttle housing 30.

Referring to FIG. 2, it will be seen that when fuel-dispensing nozzle 12 is positioned to lie in fluid-conducting passageway 18 filler neck shuttle 34 is moved against the bias of spring 36 to the inward position. Once nozzle 12 has been fully inserted into fluid-conducting passageway 18, nozzle 12 can be operated manually and/or automatically to dispense liquid fuel into fill passageway 64 in fill tube 60 of filler neck shuttle 34. This dispensed liquid fuel passes along conical bottom wall 68 and out of fill passageway 64 and into inner chamber 46 of fluid-conducting passageway 18 through fuel-discharging outlet 62 formed in a side wall of fill tube 60 and over seal 48. The liquid fuel then passes into fuel tank 14 through filler pipe (not shown). As liquid fuel passes over seal 48, it flushes contaminants off of seal 48 and provides a lubricant for the engagement of seal 48 with first and second valve seats 54, 56.

During removal of nozzle 12, spring 36 biases filler neck shuttle 34 to the outward filler neck-closing position. Prior to the completion of travel of filler neck shuttle 34 in direction 76, lower shoulder 51 "wipes" along restriction 26 until it seats in first valve seat 54 to provide the first sealed closure between filler neck shuttle 34 and fluid-conducting passageway 18. Just prior to the completion of outward travel of filler neck shuttle 34 in direction 76, upper shoulder 53 contacts second valve seat 56 to provide the second sealed closure between filler neck shuttle 34 and fluid-conducting passageway 18. By limiting the engagement between seal 48 with first and second valve seats 54, 56 to just prior to the completion of travel of filler neck shuttle 34, the abrasive wear on seal 48 is reduced.

As shown in FIGS. 6–14, the redundant sealing system can be adapted to function as a closure for an automotive fuel tank filler neck closure and as a pressure and/or vacuum release system. As shown, for example in FIGS. 6–8, the redundant seal for closing a tank filler neck 10 includes a filler neck closure 110, a closure body 112 and a pressure-relief valve assembly 114. Closure body 112 includes a threaded cylindrical side wall 116, a bottom wall 118 including a fluid-release aperture 108, where bottom wall 118 is coupled to side wall 116, a top flange 120 coupled to side wall 116, and an annular lug 122 coupled to side wall 116. Valve assembly 114 includes vacuum-relief member 124, a seal mount 126 having aperture 106, a seal 128 coupled to seal mount 126, an upper spring 130 urging seal mount 126 in a downward direction 132 so that seal 128 engages lug 122, and a lower spring 134 urging vacuum-relief member 124 in an upward direction 136 so that vacuum-relief member 124 engages seal 126. Upper spring 130 is supported on its upper end by a spring mount 131.

Figure 10:
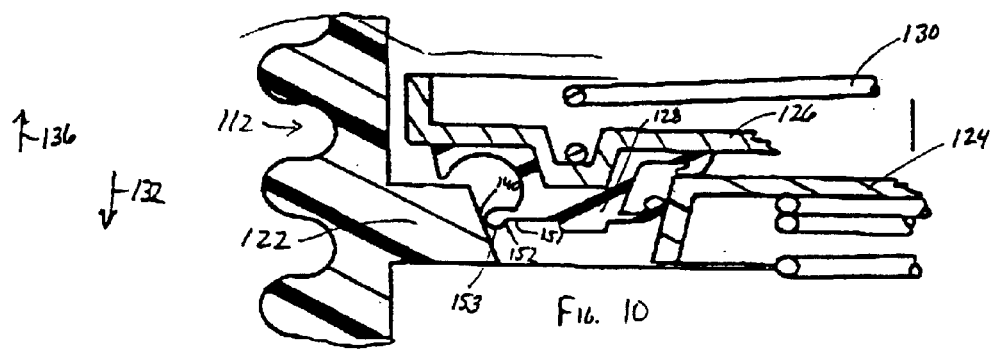
FIG. 10 is a view similar to FIG. 9 showing the position of the seal once the radially outer lower shoulder of the seal has engaged the first valve seat formed on the inclined wall of the annular lug to establish a first sealed closure but before engagement of the radially outer upper shoulder of the seal to engage the second valve seat established on the axially upwardly facing wall of the annular lug.

Annular lug 122 includes a second valve seat 138 and a first valve seat 140. Vacuum-relief member 124 also includes a second valve seat 142 and a first valve seat 144 that cooperates with first valve seat 140 of lug 122 to define a tapered annular gap 146 therebetween as shown in FIG. 10.

Seal 128 functions as two tank venting seals between closure body 112 nd vacuum-relief member 124. Seal 128 includes body member 148, outer upper and lower shoulders 150, 152, and inner upper and lower shoulders 154, 156 coupled to body member 148. Outer upper shoulder 150 engages second valve seat 138 of lug 122 at a first location 158. Outer lower shoulder 152 includes a membrane 151 coupled to body member 148 and an enlarged wiper portion 153 coupled to membrane 151 that engages first valve seat 140 of lug 122 at a second location 160 that is spaced apart from first location 158 to define a gap 159 therebetween. Inner upper shoulder 154 engages second valve seat 142 of vacuum-relief member 124 at third location 162. Inner lower shoulder 156 includes a membrane 155 coupled to body member 148 and an enlarged-wiper portion 157 coupled to membrane 155 that engages first valve seat 144 of vacuum-relief member 124 at a fourth location 164 spaced apart from third location 162 to define a gap 163 therebetween. The seal is formed to define a gap between the inner and outer upper shoulders and the seal mount to provide additional flexibility to the inner and outer upper shoulders. The gaps may extend to the edges of the inner and outer upper shoulders or may be contained between the edges thereof.

Inner and outer upper shoulders 150, 154 of seal 128 provide a first sealing engagement between closure body 112 and vacuum-relief member 124. Similarly, inner and outer lower shoulders 152, 156 provide a second sealing engagement between closure body 112 and vacuum-relief member 124. By providing two sealing engagement s between closure body 112 and vacuum-relief member 124, the leakage path between closure body 112 and vacuum-relief member 124 is sealed twice using only seal 128.

The contact between outer upper shoulder 150 and second valve seat 138 of lug 122 and the contact between inner upper shoulder 154 and second valve seat 142 of vacuum-relief member 124 are axially compressive. The contact between outer lower shoulder 152 and first valve seat 140 of lug 122 and the contact between inner lower shoulder 156 and second valve seat 142 of vacuum-relief member 124 are radially compressive. Thus, two modes of sealing are provided with a single sealing member, seal 128.

Figure 11:
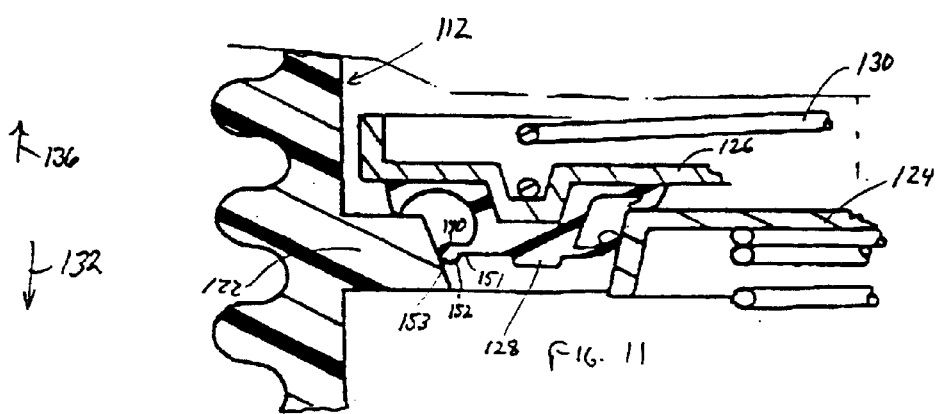
FIG. 11 is a view similar to FIGS. 9 and 10 showing the moment that the radially outer upper shoulder of the seal engages the second valve seat established on the axially upwardly facing portion of the annular lug (but before full compression of the radially outer upper shoulder of the seal against the second valve seat to establish a second sealed closure as shown, for example, in FIG. 8)
Figure 12:
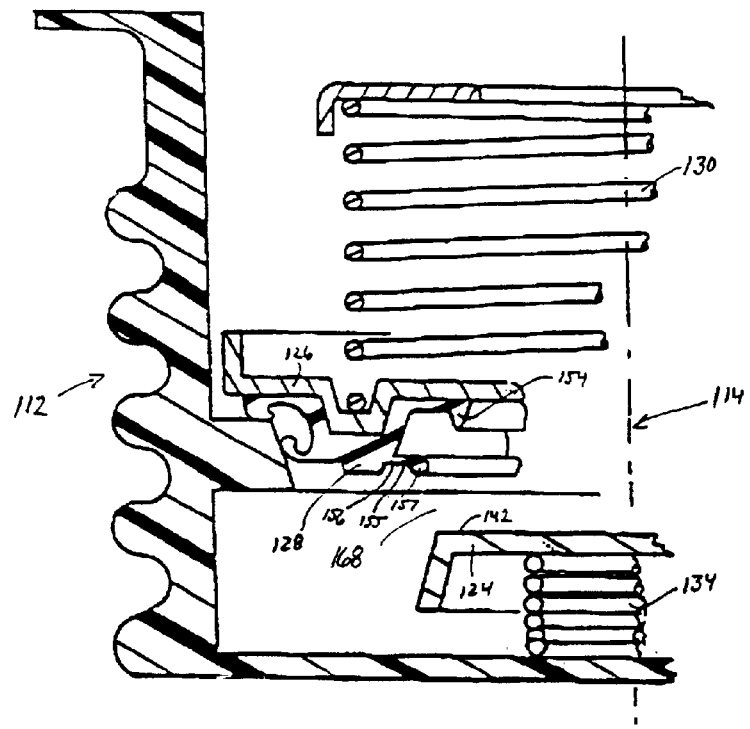
FIG. 12 is a view similar to FIGS. 9–11 showing operation of the vacuum-relief valve, and in particular, the position of the spring-loaded vacuum-relief member when it is separated from the seal to allow atmosphere to be admitted into the filler neck through an annular space provided between the seal and the lower vacuum-relief member during vacuum conditions in a fuel tank coupled to the filler neck.

As shown in FIGS. 9–14, valve assembly 114 functions as a vacuum-relief valve and a positive pressure-relief valve. When negative vapor pressure exists in the fuel tank (not shown) below a predetermined level, a pressure differential exists between the upper and lower side of vacuum-relief member 124. This pressure differential results in an imbalance of forces on vacuum-relief member 124 that pulls vacuum-relief member 124 against the bias of lower spring 134 so that vacuum-relief member 124 moves in direction 132 creating an annular gap 168 between vacuum-relief member 124 and seal 128 as shown in FIG. 12. This permits outside air to flow between vacuum-relief member 124 and seal 128 to reduce or eliminate the vacuum extant in the fuel tank.

Figure 13:
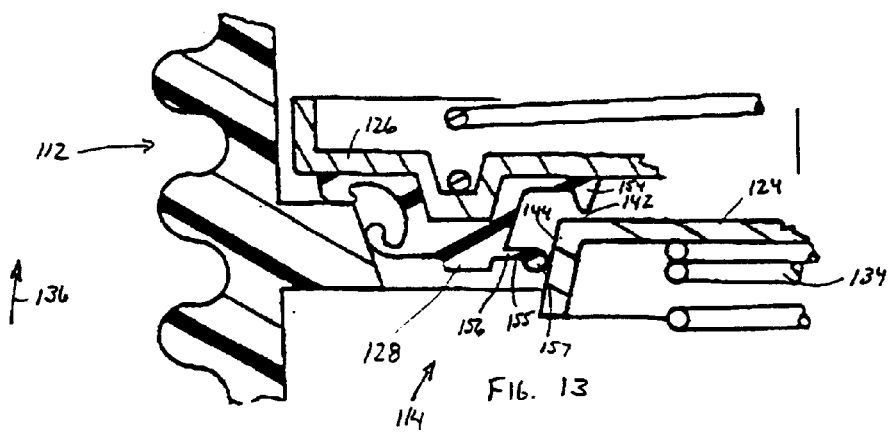
FIG. 13 is a view similar to FIG. 12 showing the position of the vacuum-relief member as it is moving upwardly under a force provided by the lower spring to cause the radially inner lower shoulder on the seal to engage a first valve seat provided on an inclined surface of the valve member to establish a first sealed closure (but before engagement of a radially inner upper shoulder on the seal with a second valve seat provided on an axially upwardly facing surface of the valve-relief member)
Figure 14:
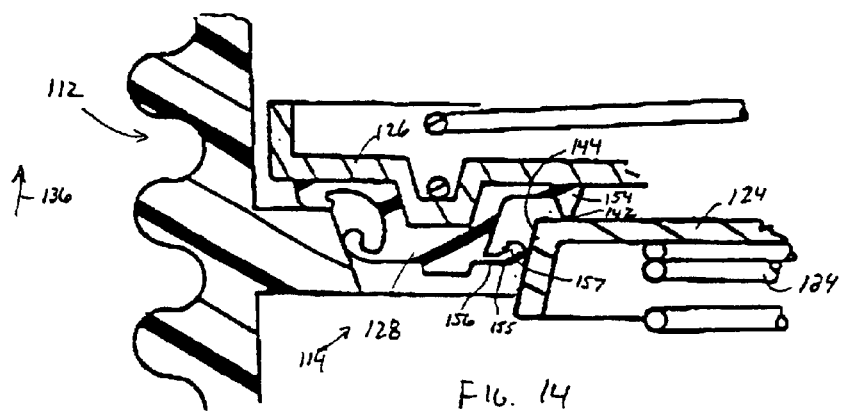
FIG. 14 is a view similar to FIGS. 12 and 13 showing the position of the radially inner upper shoulder at the moment it first contacts the second valve seat provided on the axially upwardly facing surface of the vacuum-relief member (but before full compression of the radially inner upper shoulder of the seal against the second valve seat to establish the second sealed closure between the seal and the vacuum-relief member)
Figure 15:
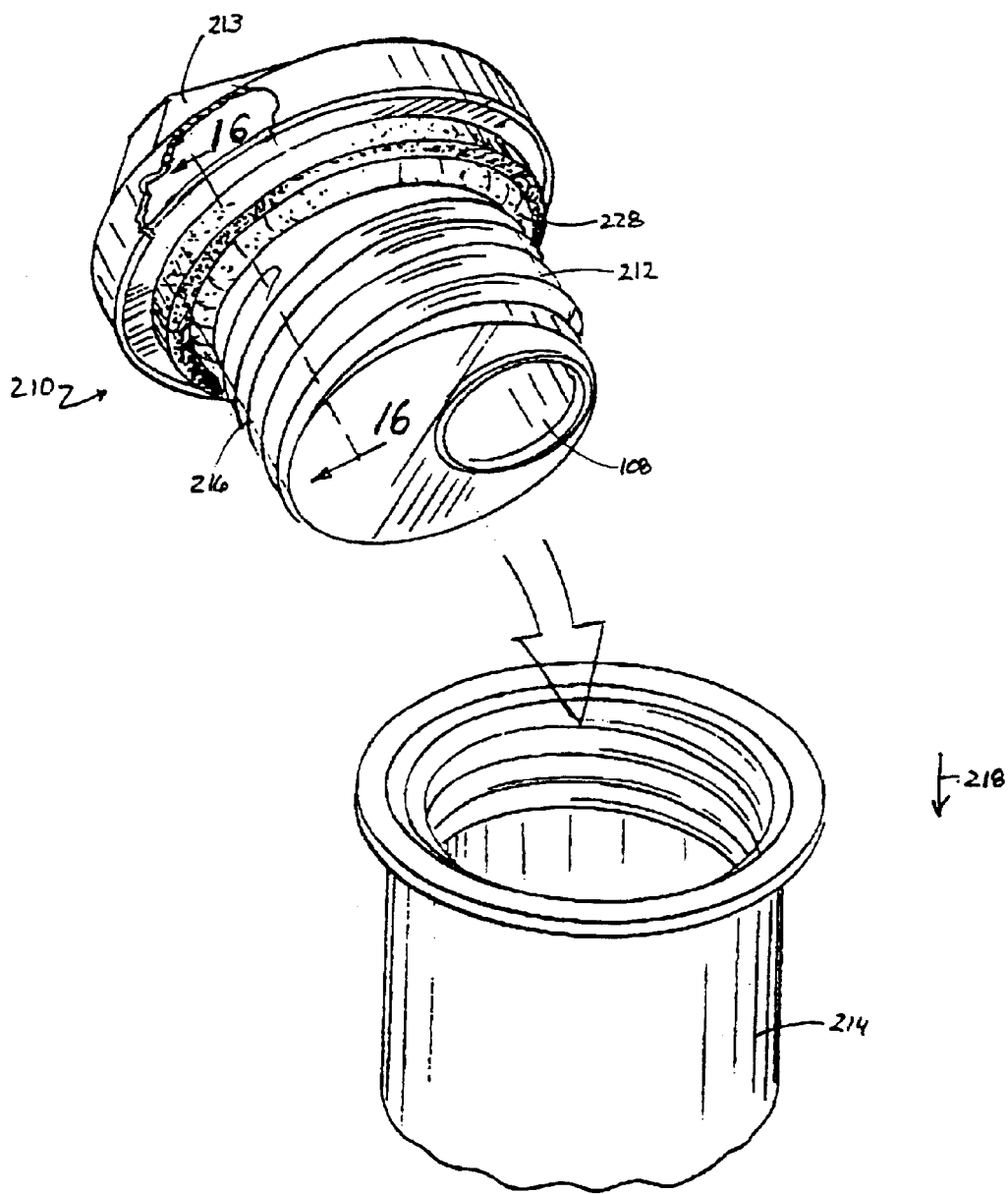
FIG. 15 is a view of another filler neck closure including a redundant seal in accordance with the present invention as it is about to be installed in a companion filler neck.

As the vacuum is reduced, the pressure difference is reduced and lower spring 134 returns vacuum-relief member 124 in direction 136 to the position shown in FIGS. 13 and finally FIG. 14. As vacuum-relief member 124 moves in direction 136, membrane 155 of inner lower shoulder 156 flexes as wiper portion 157 "wipes" on first valve seat 144 of vacuum-relief member 124 and inner upper shoulder 154 engages second valve seat 142 of vacuum-relief member 124 to provide the dual seal between closure body 112 and vacuum-relief member 124.

Figure 9:
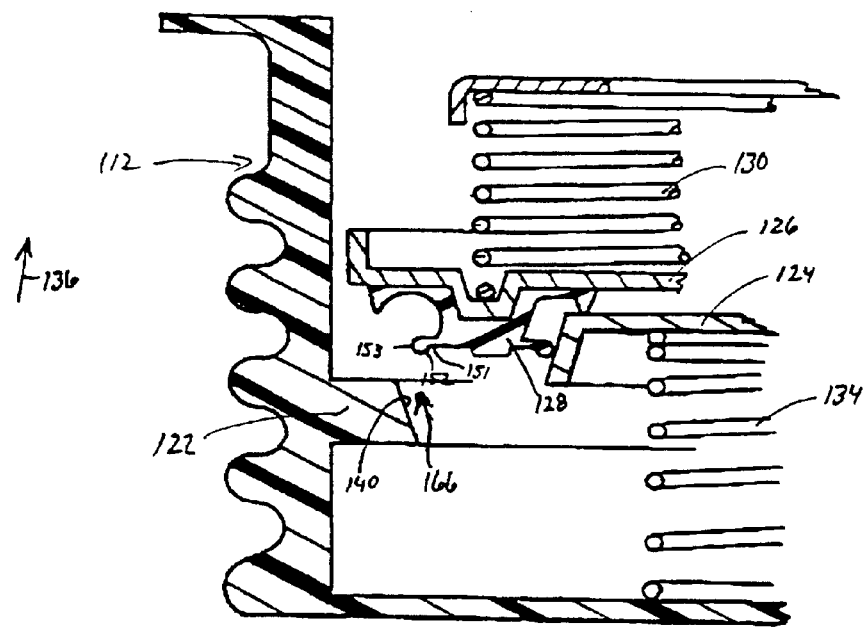
FIG. 9 is a view of a portion of the filler neck closure similar to FIG. 8 showing a pressure-relief valve established by the seal mount, seal, and vacuum-relief member in a raised position so that pressurized fuel vapor in the filler neck can vent through an annular vent channel formed by the annular lug around the pressure-relief valve to the atmosphere and showing the radially outer lower and upper shoulder of the seal in a position above and in spaced-apart relation to a first valve seat formed on an inclined portion of the annular lug and a second valve seat formed on an axially upwardly facing portion of the annular lug.

As shown in FIGS. 9–11, when positive pressure exists in the fuel tank (not shown) a pressure differential exists between the upper and lower sides of vacuum-relief member 124, seal mount 126, and seal 128. This pressure differential results in an imbalance of forces on vacuum-relief member 124, seal mount 126, and seal 128 that, when the pressure differential exceeds a predetermined level, pushes vacuum-relief member 124, seal 128, and seal mount 126 against the bias of upper spring 130 so that seal 128, seal mount 126, and vacuum-relief member 124 move in direction 136 creating an annular gap 166 between seal 128 and closure body 112 as shown in FIG. 9. Gap 166 permits reduction or elimination of the positive pressure extant in the fuel tank. The distance of upward travel of the vacuum-relief valve is restrained so that a gap develops between the vacuum-relief valve and the seal.

As the positive pressure is reduced, the pressure difference is reduced and upper spring 130 returns vacuum-relief member 124, seal mount 126, and seal 128 in direction 132 to the position shown in FIG. 11. As seal 128 moves in direction 132, membrane 151 of outer lower shoulder 152 flexes as wiper portion 153 wipes on first valve seat 140 of lug 122 and outer upper shoulder 150 engages second valve seat 138 of lug 122 to provide the dual seal between closure body 112 and vacuum-relief member 124.

Fluid-release aperture 108 is provided to expose filler neck closure 10 below vacuum-relief member 124 to pressure or vacuum extant in the fuel tank (not shown). Further, a second aperture (not shown) is provided in filler neck closure 110 above vacuum-relief member 124 to relieve the pressure or vacuum from the system.

As shown in FIGS. 15–18, a filler neck closure 210 is provided including a closure body 212 and a seal 228. A sectional view of seal 228 is shown in FIG. 16.

Closure body 212 includes a threaded cylindrical side wall 216 and a seal mount 226. Side wall 216 is configured to engage a filler neck 214 by twisting a cover 213 coupled to closure body 212 so that closure body 212 and seal 228 move in an axially inward direction 218. Filler neck 214 includes a radially extending surface 238 and an axially extending surface 240. Seal 228 functions as two tank seals between closure body 212 and filler neck 214. Seal 228 includes a body member 248 and upper and lower shoulders 250, 252 coupled to body member 248. Upper shoulder 250 engages radially extending surface 238 of filler neck 214 at a second valve seat 258. Lower shoulder 252 engages axially extending surface 240 of filler neck 214 at a first valve seat 260 that is spaced apart from second valve seat 258 to define a gap 259 therebetween.

By providing two valve seats for sealing engagement between closure body 212 and filler neck 214, the leakage path between closure body 212 and valve member filler neck 214 is sealed twice using only seal 228. The contact between upper shoulder 250 and second valve seat 258 of filler neck 214 is axially compressive and the contact between lower shoulder 252 and first valve seat 260 of filler neck 214 is radially compressive so that two modes of sealing are provided with a single sealing member, seal 228. The compressive load is equal to the upward force exerted by the spring.

Figure 18:
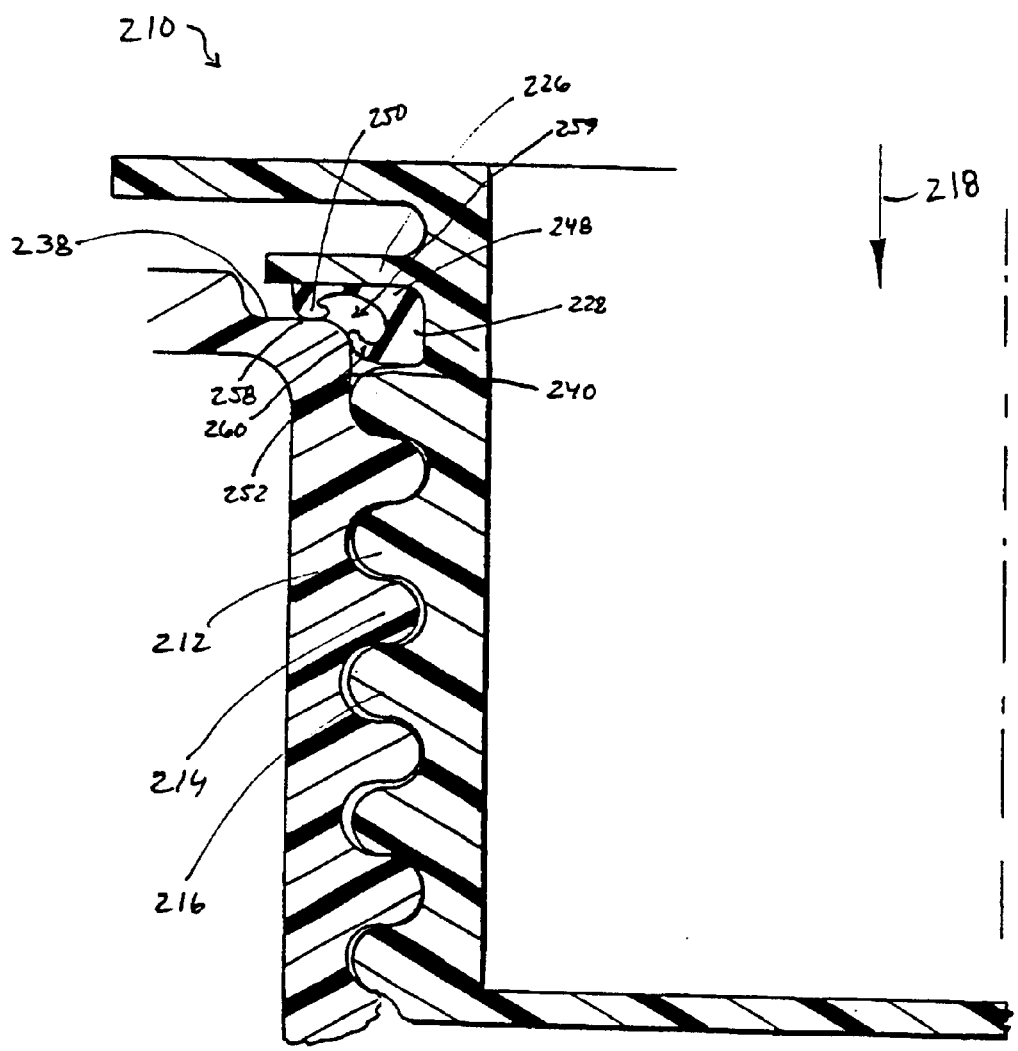
FIG. 18 is a view similar to FIGS. 16 and 17 showing further movement of the closure into the open mouth of the filler neck to cause full compression of the lower shoulder against the first valve seat to establish a first sealed closure and full compression of the upper shoulder against the second valve seat to establish a second sealed closure in spaced-apart relation to the first sealed closure to establish a redundant seal between the closure and the filler neck.

As the closure body 212 is turned onto filler neck 214, seal 228 moves in direction 218 so that lower shoulder 252 flexes and wipes on axially extending surface 240 until it engages first valve seat 260 of filler neck 214 and upper shoulder 250 engages upper surface 238 of filler neck 214 to provide the dual seal between closure body 212 and filler neck 224, as shown in FIG. 18

Although the invention has been described in detail with reference to certain preferred embodiments, variations and modifications exist within the scope and spirit of the invention as described and defined in the following claims.

What is claimed is:
1. A filler neck closure apparatus comprising
   a fluid conduit formed to include a fluid-conducting passageway and first and second valve seats associated with the fluid-conducting passageway, a seal mount movable in the fluid-conducting passageway, and a seal coupled to the seal mount to move therewith in the fluid-conducting passageway relative to the first and second valve seats to engage each of the first and second valve seats to establish a closed position in the fluid conduit and block flow of fluid in the fluid-conducting passageway, the seal including a body, a lower shoulder coupled to the body and arranged to engage the first valve seat upon movement of the seal to the closed position to establish a first sealed closure in the fluid-conducting passageway, and an upper shoulder coupled to the body and arranged to engage the second valve seat upon movement of the seal to the closed position to establish a second sealed closure in the fluid-conducting passageway in spaced-apart relation to the first sealed closure so that the first and second sealed closures cooperate to block flow of fluid through the fluid-conducting passageway.

2. The apparatus of claim 1, wherein the fluid conduit includes an interior wall defining the fluid-conducting passageway and a lug coupled to the interior wall and positioned to lie in the fluid-conducting passageway, the interior wall includes the first valve seat, and the lug includes the second valve seat.

3. The apparatus of claim 2, wherein the lug includes a base coupled to the interior wall and a tip coupled to the base and positioned to lie in spaced-apart relation to the interior wall to define a cavity therebetween.

4. The apparatus of claim 3, wherein the fluid conduit includes a central axis and an inlet at one end thereof and the tip of the lug includes an axially inner surface facing away from the inlet and defining the second valve seat.

5. The apparatus of claim 4, wherein the axially inner surface is annular.

6. The apparatus of claim 3, wherein the tip includes a surface defining the second valve seat and the seal and the fluid conduit cooperate to define a gap therebetween upon engagement of the lower shoulder of the seal and the first valve seat on the interior wall and the upper shoulder of the seal and the second valve seat on the tip to establish the first and second sealed closures.

7. The apparatus of claim 6, wherein each of the first and second valve seats and the upper and lower shoulders is annular.

8. The apparatus of claim 2, wherein the lug includes a radially inwardly facing surface lying in spaced-apart relation to the seal mount upon movement of the seal to the closed position and an axially downwardly facing surface arranged to lie at about a right angle to the radially inwardly facing surface to define the second valve seat and the upper shoulder of the seal engages the axially downwardly facing surface of the lug upon movement of the seal to the closed position to establish the second sealed closure.

9. The apparatus of claim 8, wherein the axially downwardly facing surface is annular.

10. The apparatus of claim 8, wherein the axially downwardly facing surface is curved.

11. The apparatus of claim 8, wherein the lug also includes an inclined conical surface converging in a direction toward the seal and the radially inwardly facing surface is positioned to lie between the inclined conical surface and the axially downwardly facing surface.

12. The apparatus of claim 1, wherein the seal mount is a filler neck shuttle movable in the fluid-conducting passageway and the seal is coupled to an axially inner end of the filler neck shuttle.

13. The apparatus of claim 1, wherein the fluid conduit is a closure member included in a removable fuel cap and sized to engage and close the open end of a filler neck and the seal mount is a spring-loaded support plate positioned to lie in the fluid-conducting passageway.

14. The apparatus of claim 13, wherein the closure member includes an interior wall defining the fluid-conducting passageway and an annular lug coupled to the interior wall and formed to include the first and second valve seats and the seal is a pressure-relief valve including a radially outer lower shoulder arranged to engage the first valve seat and a radially outer upper shoulder arranged to engage the second valve seat.

15. The apparatus of claim 14, wherein the spring-loaded plate is formed to include a central aperture and further comprising a vacuum-relief member supported to open and close the central aperture, the vacuum-relief member including first and second valve seats, a radially inner lower shoulder on the seal engaging the first valve seat on the vacuum-relief member, and a radially inner upper shoulder on the seal engaging the second valve seat.

16. The apparatus of claim 1, wherein the fluid conduit is a filler neck, the seal mount is a closure member included in a removable fuel cap and sized to engage and close the open end of the filler neck.

17. The apparatus of claim 16, wherein the filler neck includes an inlet opening, a radially inwardly facing interior wall providing the first valve seat near the inlet opening, and an axially outwardly facing outer wall at the inlet opening.

18. A filler neck closure apparatus comprising
a seal mount,
a seal coupled to the seal mount for sliding axial movement in a filler neck leading to a fuel tank, and
a fluid conduit formed to include a fluid-conducting passageway in the filler neck and means for sealing said filler neck by providing a first valve seat to establish a first sealed closure with the seal upon sliding axial movement of the seal mount in the fluid conduit to assume a passageway-closing position in the fluid-conducting passageway and a second valve seat to establish a second sealed closure with the seal upon movement of the seal mount in the fluid conduit to assume a passageway-closing position in the fluid-conducting passageway so that when the first and second sealed closures are established, a leakage path in the filler neck through the fluid-conducting passageway between the fluid conduit and the seal mount is sealed twice.

19. The apparatus of claim 18, wherein the first valve seat is positioned to lie a first distance from the seal mount, the second valve seat is positioned to lie a second distance from the seal mount, and the second distance is less than the first distance.

20. The apparatus of claim 18, wherein the fluid conduit includes an interior wall defining the fluid-conducting passageway and a lug coupled to the interior wall and positioned to lie in the fluid-conducting passageway, the interior wall includes the first valve seat, and the lug includes the second valve seat.

21. The apparatus of claim 20, wherein the lug includes a base coupled to the interior wall and a tip coupled to the base and positioned to lie in spaced-apart relation to the interior wall to define a cavity therebetween and wherein the fluid conduit includes a central axis and an inlet at one end thereof and the tip of the lug includes an axially inner surface defining the second valve seat.

22. The apparatus of claim 21, wherein the seal and the fluid conduit cooperate to define a gap therebetween upon engagement of the seal and the first and second valve seats to establish the first and second sealed closures.

23. A filler neck closure apparatus comprising
a fluid conduit formed to include a fluid-conducting passageway in a filler neck leading to a fuel tank,
a seal mount mounted for sliding axial movement in the fluid conduit, and
seal means on the seal mount for establishing a first sealed closure with the fluid conduit upon sliding axial movement of the seal mount in the fluid conduit to assume a passageway-closing position in the fluid-conducting passageway and a second sealed closure with the fluid conduit upon movement of the seal mount in the fluid conduit to assume a passageway-closing position in the fluid-conducting passageway so that when the first and second sealed closures are established, a leakage path in the filler neck through the fluid-conducting passageway between the fluid conduit and the seal mount is sealed twice.

24. The apparatus of claim 23, wherein the fluid conduit includes a first valve seat and a second valve seat and the seal means includes a lower shoulder arranged to engage the first valve seat to establish the first sealed closure and an upper shoulder arranged to engage the second valve seat to establish the second sealed closure.

25. The apparatus of claim 23, wherein the seal means includes a body, a lower shoulder coupled to the body and arranged to engage the fluid conduit upon movement of the seal mount to the closed position to establish the first sealed closure in the fluid-conducting passageway, and an upper shoulder coupled to the body and arranged to engage the fluid conduit upon movement of the seal to the closed position to establish the second sealed closure in the fluid-conducting passageway in spaced-apart relation to the first sealed closure so that the first and second sealed closures cooperate to block flow of fluid through the fluid-conducting passageway.

26. The apparatus of claim 25, wherein each of the upper and lower shoulders is annular.

27. The apparatus of claim 25, wherein the seal mount is a filler neck shuttle movable in the fluid-conducting passageway and the upper shoulder is coupled to an axially inner end of the filler neck shuttle.

28. The apparatus of claim 25, wherein the seal mount is a filler neck shuttle movable in the fluid-conducting passageway and the lower shoulder is coupled to an axially inner end of the filler neck shuttle.

29. The apparatus of claim 23, wherein the fluid conduit is a closure member included in a removable fuel cap and sized to engage and close the open end of a filler neck and the seal mount is a spring-loaded support plate positioned to lie in the fluid-conducting passageway.

30. The apparatus of claim 28, wherein the fluid conduit includes a first valve seat and a second valve seat, the closure member includes an interior wall defining the fluid-conducting passageway and an annular lug coupled to the interior wall and formed to include the first and second valve seats, and the seal means includes a pressure-relief valve including a radially outer lower shoulder arranged to engage the first valve seat and a radially outer upper shoulder arranged to engage the second valve seat.

31. The apparatus of claim 29, wherein the spring-loaded plate is formed to include a central aperture and further comprising a vacuum-relief member supported to open and close the central aperture, the vacuum-relief member including first and second valve seats, a radially inner lower shoulder on the seal engaging the first valve seat on the vacuum-relief member, and a radially inner upper shoulder on the seal engaging the second valve seat.

* * * * *